US010387236B2

(12) United States Patent
Gerstl et al.

(10) Patent No.: US 10,387,236 B2
(45) Date of Patent: Aug. 20, 2019

(54) PROCESSING DATA ERRORS FOR A DATA PROCESSING SYSTEM

(71) Applicant: International Business Machines Corporation, Armonk, NY (US)

(72) Inventors: Peter Gerstl, Holzgerlingen (DE); Mike Grasselt, Leinfelden-Echterdingen (DE); Albert Maier, Tuebingen (DE); Thomas Schwarz, Stuttgart (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 14/842,891

(22) Filed: Sep. 2, 2015

(65) Prior Publication Data

US 2016/0092290 A1    Mar. 31, 2016

(30) Foreign Application Priority Data

Sep. 29, 2014 (GB) .................................. 1417129.2

(51) Int. Cl.
  *G06F 11/00* (2006.01)
  *G06F 11/07* (2006.01)
(52) U.S. Cl.
  CPC ........ *G06F 11/079* (2013.01); *G06F 11/0706* (2013.01); *G06F 11/0787* (2013.01)
(58) Field of Classification Search
  CPC .. G06F 11/076; G06F 11/079; G06F 11/0706; G06F 11/0787
  USPC .......................................................... 714/26
  See application file for complete search history.

(56) References Cited

U.S. PATENT DOCUMENTS

| 7,373,552 | B2* | 5/2008 | Bjorsne ............... G06F 11/0748 714/37 |
| 7,529,974 | B2* | 5/2009 | Thibaux ................. G06Q 10/04 714/26 |
| 7,844,641 | B1 | 11/2010 | Sengupta et al. |
| 7,908,249 | B1* | 3/2011 | Gupta ............... G06F 17/30371 707/609 |

(Continued)

FOREIGN PATENT DOCUMENTS

WO    2013187816 A1    12/2013

OTHER PUBLICATIONS

Search Report (UK), Reference No. DE9-2014-0116, Application No. GB1417129.2, dated Apr. 2, 2015, pp. 1-4.

(Continued)

*Primary Examiner* — Elmira Mehrmanesh
(74) *Attorney, Agent, or Firm* — Robert C. Bunker

(57) ABSTRACT

Processing data errors in a data processing system, includes a computer receiving one or more patterns and a data set. The one or more patterns describe characteristics of an erroneous data record and are associated with a root cause. The root cause includes a description of a technical deficiency causing the data error in the erroneous data record. Responsive to the computer determining that a first set of data records in the received data set have characteristics that match a first pattern of the one or more patterns, the computer assigns the first set of data records of the received data set having characteristics that match the first pattern to a first error group.

17 Claims, 5 Drawing Sheets

(56) References Cited

U.S. PATENT DOCUMENTS

| | | | |
|---|---|---|---|
| 8,060,782 B2* | 11/2011 | Caspi | G06F 11/0709 714/26 |
| 8,074,103 B2* | 12/2011 | Dilman | G06F 11/0727 707/690 |
| 8,688,625 B1 | 4/2014 | Clark et al. | |
| 8,751,438 B2 | 6/2014 | Kharod et al. | |
| 8,782,609 B2* | 7/2014 | Robinson | G06F 11/3692 717/127 |
| 9,367,580 B2* | 6/2016 | Gullin | G06F 11/3452 |
| 9,454,561 B2* | 9/2016 | Gullin | G06F 17/30303 |
| 2008/0307262 A1* | 12/2008 | Carlin, III | G06F 16/215 714/37 |
| 2009/0182794 A1* | 7/2009 | Sekiguchi | G06F 11/0748 |
| 2011/0055620 A1* | 3/2011 | Sengupta | G06F 17/30011 714/2 |
| 2011/0066908 A1* | 3/2011 | Bartz | G06F 11/0709 714/746 |
| 2011/0138312 A1* | 6/2011 | Yeh | G06F 17/30539 715/771 |
| 2012/0330911 A1* | 12/2012 | Gruenheid | G06F 17/30303 707/694 |
| 2013/0268494 A1 | 10/2013 | Tahiliani et al. | |
| 2013/0275360 A1* | 10/2013 | Kharod | G06F 17/30563 707/602 |
| 2014/0025625 A1 | 1/2014 | Erla et al. | |
| 2014/0279835 A1 | 9/2014 | Li et al. | |
| 2014/0279934 A1* | 9/2014 | Li | G06F 17/30563 707/687 |
| 2015/0046389 A1* | 2/2015 | Dhayapule | G06F 17/30563 707/602 |

OTHER PUBLICATIONS

Application No. 1417129.2 titled "A method of processing data errors for a data processing system," filed on Sep. 29, 2014, pp. 1-34.

Disclosed Anonymously, "A Method and System for Root Cause Analysis of Change Requests At Aggregate Levels of Project Development and Management," IP.com No. IPCOM000228067D, IP.com Electronic Publication: Jun. 4, 2013, pp. 1-4.

* cited by examiner

PROCESSING DATA ERRORS FOR A DATA PROCESSING SYSTEM

BACKGROUND

The present disclosure relates generally to computing systems, and more particularly to processing data errors.

Many data processes in data processing systems depend on a good quality of the data they are working with. For example, there are data processes that might only run successfully if data values comply with an expected format. However, establishing a sufficient data quality level is a significant challenge during data integration projects and many data processing projects may fail to fulfil their goals because they are not able to address this aspect sufficiently.

SUMMARY

Embodiments of the present invention disclose a method, computer program product, and system to provide improved processing of data errors with root cause analysis.

Processing data errors in a data processing system, includes a computer receiving one or more patterns and a data set. The one or more patterns describe characteristics of an erroneous data record and are associated with a root cause. The root cause includes a description of a technical deficiency causing the data error in the erroneous data record. Responsive to the computer determining that a first set of data records in the received data set have characteristics that match a first pattern of the one or more patterns, the computer assigns the first set of data records of the received data set having characteristics that match the first pattern to a first error group.

In another aspect, a computer program product for processing data errors in a data processing system, the computer program product comprising one or more computer readable storage medium and program instructions stored on at least one of the one or more computer readable storage medium, the program instructions including computer program instructions to receive one or more patterns and a data set. The one or more patterns describe characteristics of an erroneous data record and are associated with a root cause. The root cause includes a description of a technical deficiency causing the data error in the erroneous data record. Responsive to the computer determining that a first set of data records in the received data set have characteristics that match a first pattern of the one or more patterns, program instructions assign the first set of data records of the received data set having characteristics that match the first pattern to a first error group.

In another aspect, a computer system for processing data errors in a data processing system, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions including computer program instructions to receive one or more patterns and a data set. The one or more patterns describe characteristics of an erroneous data record and are associated with a root cause. The root cause includes a description of a technical deficiency causing the data error in the erroneous data record. Responsive to the computer determining that a first set of data records in the received data set have characteristics that match a first pattern of the one or more patterns, program instructions assign the first set of data records of the received data set having characteristics that match the first pattern to a first error group.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
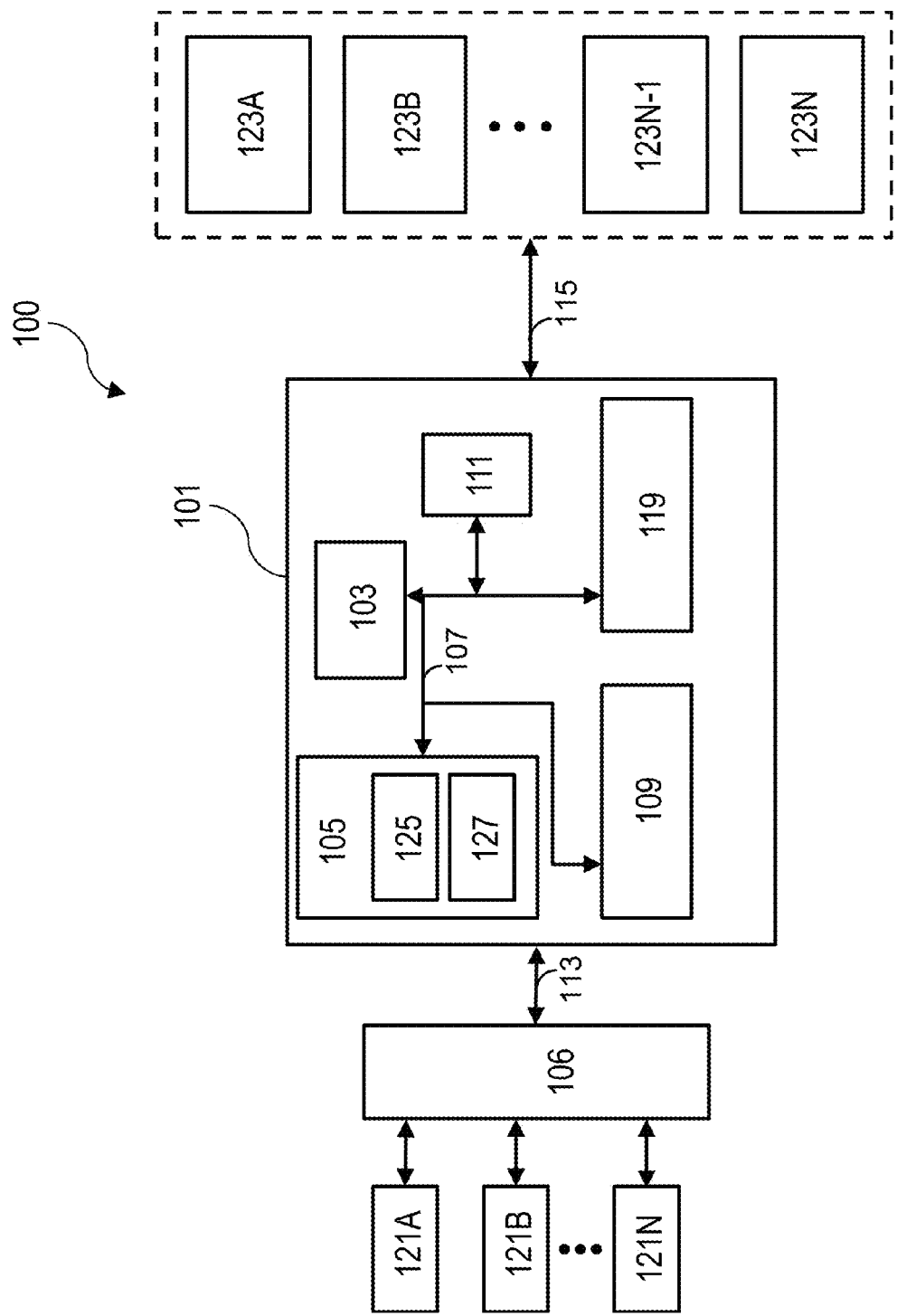
FIG. 1 illustrates an exemplary data processing system for processing data errors, in accordance with an embodiment of the present disclosure.

In the following, like numbered elements in the figures either designate similar elements or designate elements that perform an equivalent function. Elements which have been discussed previously will not necessarily be discussed in later figures if the function is equivalent.

The data processing system may include a data warehouse analysis system that provides hardware and/or software components that can be used to analyze data, e.g. the data set. For example, the data processing system may provide a reporting component for providing analysis reports on the data.

The term "data set" refers to one or more data tables having columns and rows. A data record of the data set refers to a record of the data table (e.g. a tuple or an entry of the data table). A data set may be stored in one or more data sources, including a computer or storage server for storing, processing and/or transmitting data.

The term "data error", as used herein, refers to an error such as unexpected or unspecified values that may relate to the content and/or format of the data record. The data error may indicate, for example, incorrect or invalid values of the data record. An erroneous data record is a data record that is affected by a data error.

The term "root cause", as used herein, refers to a technical deficiency of a given hardware and/or software component of the data processing system that causes a data error in an erroneous data record. The technical deficiency may directly cause the data error in the erroneous data record or may cause a chain of other technical deficiencies that results in the data error in the erroneous data record. For example, the root cause may indicate a complex technical problem in a system that might manifest itself by way of artifacts or deficiencies that are associated with the underlying subsystems within the system.

An error group, as used herein, refers to a computer file, computer folder, and/or a data table comprising erroneous data records. The error group also refers to a group of erroneous data records having a tag indicating the error group.

Embodiments of the present disclosure may have the advantage of providing an automatic and efficient method for detecting and grouping erroneous data records. This may provide a better overview on the reporting side of the data processing system, which may dramatically reduce the burden of error management versus treating errors individually.

On the reporting side, the number of groups that are connected with the data errors may be used for a better estimation of the processing resources required to fix the data errors. For example, a few hundred individual data errors might require much more processing resources to resolve than a few million systematic data errors that can all get resolved by a single modification that fixes the root cause.

Another advantage of embodiments of the present disclosure may be its seamless integration into existing data warehousing systems, as it may be implemented with a low software and/or hardware burden.

According to one embodiment, the assigning of erroneous data records to an error group is performed if the percentage of non-erroneous data records in the first set of data records is less than a threshold value.

According to one embodiment, a second set of data records from the received data set may be determined to have characteristics that match a second pattern of the one or more patterns and erroneous data records of the second set of data records may be assigned to a second error group in response to a determination that the percentage of non-erroneous data records in the second set of data records is less than a threshold value and that the first error group does not include the erroneous data records of the second set of data records. This may keep the number of groups created to a minimum, and thus may save resources that would otherwise be required for processing multiple error groups having the same erroneous data records.

According to one embodiment, the first and second error groups may be merged in response to a determination that the respective root causes are the same. This may facilitate the subsequent management of the first and second error groups. For example, instead of treating each of the first and second groups individually, only the merged group may be treated. This may save resources in the data processing system.

According to one embodiment, the data set is processed by one or more processes before being received, wherein the root cause of the first pattern causes at least a first failure in a respective at least one process of the one or more processes. Where the root cause of the second pattern causes at least a second failure in a respective at least one process of the one or more processes, the embodiment may merge the first and second error groups in response to a determination that the first and the second failures occur in at least one same process of the one or more processes. The merged group may, for example, be sent to a technical support system.

According to one embodiment, the data set is an Extract Transform and Load, ETL, processed data set, wherein the root cause includes a failure in a data operation of the ETL process. A data operation of the ETL process may be part of the extract, transformation or load process.

According to one embodiment, multiple technical support systems for providing technical repairs for the erroneous data records may be provided, the multiple technical support systems having one or more predefined technical tasks. The embodiment may select a technical support system of the multiple technical support systems whose technical task matches the root cause associated with the first pattern, send the first error group to the selected technical support system, and request a technical repair of the root cause, thereby fixing the erroneous data records of the first error group.

For example, an embodiment may use the root cause to generate a single correction template that may be used to fix all the received erroneous data records, instead of fixing the erroneous data records individually.

This may save resources in the data processing system that would otherwise be required to perform the iteration between the technical support systems and the error handling module in order to find the right technical support system that may fix the root cause. This is particularly advantageous in cases of large data processing systems, e.g. cloud systems, where many data sources exist and the amount of data errors that are detected can be relatively high.

This embodiment may reduce the process time for fixing or correcting data errors by, for example, avoiding assigning the data errors to the wrong technical support.

According to one embodiment, a technical repair of the root cause of the first pattern for fixing erroneous data records of the first error group may be provided.

According to one embodiment, the characteristics of a data record indicate at least one of the data source of the data record, the processes that produced the data record, and the content of the data record.

Certain embodiments may utilize a decision tree having one or more nodes, each node representing a decision test based on the respective one or more patterns.

Typical data validation approaches provide overviews on the number of errors in data and provide drill-down capabilities to drill into the data along predefined axes, such as from data object to table to field or access to one type of data error. Typical data validations detect the individual error and display the error. Typical exception management systems may be configured to detect data errors, and create a single exception for each data error detected. They may also provide reporting capabilities with drill down capabilities along similar predefined axes as above, but ultimately focus on creating exceptions to keep track of which data errors are still open to be resolved and assigning technical support for each exception. Embodiments of the present invention create groups of errors (and associated exception groups) for groups of records, identifying the root cause of data errors or groups of erroneous data records. Embodiments of the present invention also distinguish among different technical tasks when assigning technical support systems to exceptions or error groups.

FIG. 1 illustrates and exemplary data processing system 100 for processing data errors, in accordance with an embodiment of the present disclosure. The data processing system 100 may, for example, be part of a zEnterprise® system of IBM® which includes an IBM DB2 database system. The data processing system may include a data warehousing system, such as IBM InfoSphere Warehouse.

The data processing system 100 provides an error handling module 101. The error handling module 101 may be a computer system. The components of error handling module 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Error handling module 101 typically includes a variety of computer system readable media. Such media may be any available media that is accessible by error handling module 101, and it includes both volatile and non-volatile media, removable and non-removable media.

Error handling module 101 may also communicate with one or more external devices such as a keyboard, a pointing device, a display, etc.; one or more devices that enable a user to interact with error handling module 101; and/or any devices (e.g., network card, modem, etc.) that enable error handling module 101 to communicate with one or more other computing devices. Such communication can occur via I/O interface(s) 119. Still yet, error handling module 101 can communicate with one or more networks such as a local area network (LAN), a general wide area network (WAN), and/or a public network (e.g., the Internet) via network adapter 109. As depicted, network adapter 109 communicates with the other components of error handling module 101 via bus 107.

Memory system 105 is configured to store a plurality of applications that are executable on the processor 103. For example, the memory system 105 may include an operating system as well as application programs.

The error handling module 101 may be connected to one or more data sources 121A, 121B, . . . , 121-N. Hereinafter, in the interest of clarity one or more data sources of data source 121A-N may be referred to as 121. The connection to the data source 121 may be via a wired connection or via a network 113, which may be a public network, such as the Internet, a private network, such as a wide area network (WAN), or a combination thereof.

The data source 121 may include a storage system for storing data sets and/or processing the data sets. The data source 121 may provide data about a storage environment. The data source 121 may contain relational databases, Extensible Markup Language (XML) files, Excel spreadsheets, table-structured files, or other objects. The data source 121 may store data or operational information of a user, e.g., in unstructured text and/or structured data that are input into the system. For example, the data source 121 may include an application such as an enterprise resource planning (ERP) system. This implies that the data provided by the data source 121 may be constrained to syntactic and semantic correctness constraints of the data source.

The data source 121 may be configured to send, either automatically or upon request, data sets to the error handling module 101. In another example, an Extract-Transform-Load (ETL) module 106 may extract data from data source 121 and may push the data into error handling module 101 for analysis.

In an exemplary embodiment, the error handling module 101 may be connected to technical support systems 123A, 123B . . . 123N-1, 123-N. The connection to the technical support systems 123A-N may be via a wired connection or via a network 115, which may be a public network, such as the Internet, a private network, such as a wide area network (WAN), or a combination thereof.

A technical support system 123A-N may include a processing device configured to receive erroneous data records from the error handling module 101 and to provide technical repairs for the received erroneous data records. The technical support systems 123A-N have one or more technical tasks. For example, the technical support system 123A may have the technical task of providing technical repairs for erroneous data records that are received from a specific data source 121, e.g. a data source that is located in a predefined location, e.g. Europe.

Memory system 105 may be configured to store a one or more patterns 125, wherein each of the some or all of the patterns 125 may describe characteristics of one or more erroneous data records. The characteristics may include, for example, an indication of the data source 121 of the one or more erroneous data records, the processes that produced the one or more erroneous data records, and/or the content of the one or more erroneous data records. The pattern 125 may be associated with a root cause. The root cause includes a description of a technical deficiency that causes the data error of the erroneous data record. For example, the root cause may indicate a software and/or hardware component of the data sources 121, and/or the ETL module 106, that has the technical deficiency.

For example, the one or more patterns and the associated root cause may be provided as part of an error model that further indicates the technical support system that can provide technical repairs for the root cause. The error model may be implemented as a computer program, wherein each pattern is implemented as a function that receives data records of the data set (or each data record of the data set) as input, classifies the records in the set as either being correct or erroneous, and assigns potential root causes to those errors classified as erroneous based on the error model. The function may include, for example, conditions on the data source of data records. The function may further implement one or more validation rules to detect or determine the erroneous data records. For example, a validation may include a condition (such as a range of validity) on a value or a combination of values of the data records. The validation rule may include, for example, any arithmetic, logical, relational expression or a Boolean expression including one or more Boolean conditions, etc.

Memory system 105 may further include a root cause analysis component 127.

The operation of the data processing system 100 will be described in details with reference to FIGS. 2-5.

Figure 2:
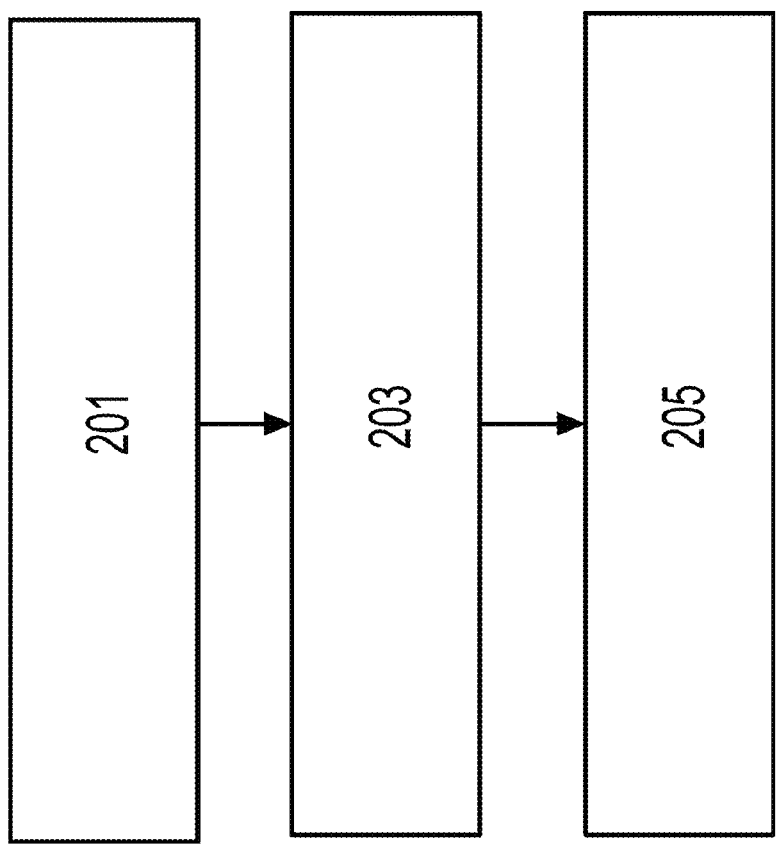
FIG. 2 is a flowchart for processing data errors, in accordance with an embodiment of the present disclosure.

FIG. 2 is a flowchart for processing data errors in the data processing system 100, in accordance with an embodiment of the present disclosure.

At 201, the root cause analysis component 127 may receive at least one data set from one or more data sources 121. The data set may be received via network 113. For example, the data set may be automatically forwarded by the data source 121. In another example, the data set may be an ETL processed data set that is processed by the ETL module 106 before being received or intercepted by the root cause analysis component 127 of the error handling module 101. An ETL processed data set refers to a data set that is first read by the ETL module 106 from the data source 121, transformed, and then loaded into a target system. For example, the error handling module 101 may or may not be part of the target system. At various stages of the ETL process the error handling module 101 may come into play. For example, an error may reflect a violation of the target system's requirements (which may cause the load to fail).

At 203, the root cause analysis component 127 may determine a first set of data records of the received data set have characteristics that match a first pattern, of the one or more patterns 125. For example, the matched pattern may be that the data records of the first set of data records are received from the same data source 121. If the data set is a computer file, its data blocks may be stored in different data sources 121. In this example, the first set of data records may include data blocks that are received from the same data source, e.g. 121A.

If, for example, the first pattern describes characteristics of a single erroneous data record, the root cause analysis component 127 may check whether each data record of the data set fulfills the condition described by the first pattern. For example, the root cause analysis component 127 may determine the source address of each data record's data source, e.g. an IP address of the data source 121 from which the data record is received, and check whether that source address corresponds with the address indicated in the first pattern, and if so, the data record may be determined to match the first pattern.

In another example, if the first pattern describes multiple erroneous data records that are all from the same data source 121, the root cause analysis component 127 may check each set of data records of the data set to determine whether the set of data records match the first pattern, i.e., all the data records of the checked set of data records are received from the same data source 121. The first set of erroneous data records may have resulted from matching a single erroneous data record because the first set includes data records that are all received from the same data source 121.

At 205, the root cause analysis component 127 may assign erroneous data records of the first set of data records to a first error group based on the data records of the first set of data records.

In various embodiments, assigning erroneous data records of the first set of data records to a first error group may include creating a computer container or a computer folder, and putting the erroneous data records in the container. In other embodiments, the erroneous data records may be flagged, by a flag indicative of the first error group, and erroneous data records having the same flag may be collectively treated as a single group.

Assigning erroneous data records of the first set of data records to a first error group may, for example, be performed if the percentage of non-erroneous data records in the first set of data records is less than a threshold value. The threshold value may, for example, be 95%.

In an alternative example, assigning erroneous data records of the first set of data records to a first error group may be done even if a single erroneous data record is detected in the first set of data records.

In another example, assigning may be performed if the percentage of non-erroneous data records in a second set of data records is less than the threshold value, and if the first error group does not include the erroneous data records of another error group that may have been previously created, as described above for the first error group.

The erroneous data records of the first set of data records may be detected using a data quality rule evaluation component (not shown) that runs one to many data validation rules on the data set. The data quality rule evaluation component may be part of the error handling module 101 and/or the ETL module 106. In certain embodiments, a validation rule of the data validation rules may require that the data record content includes unexpected content, having a value of an unknown type, e.g. NaN. Further details on the data validation rules are provided below.

In various embodiments, an exception group may be created for the first error group, wherein the exception group includes the first group in association with information indicative of at least the root cause, and the technical support system 123 that has a technical task capable of solving the deficiency indicated by the root cause. The exception group may be passed to the technical support system 123 that is indicated in the information, in order to fix or provide technical repairs for the erroneous data records.

In various embodiments, 201 may be repeated such that a second set of data records of the data set that match a second pattern of the one or more patterns may be determined, and 203 may be repeated to assign erroneous data records of the second set of data records to a second error group as described above.

In one embodiment, the first and second error groups may be merged if the root cause is the same for the first and second pattern. For example, the erroneous data records of the first error group and the second error group may be received from two respective data sources 121, however, the data error for their erroneous data records relates to or affects the same field. In this case, the merging may be beneficial since the fix for both groups, although coming from different data sources 121, may be the same.

In various embodiments, a model of different kinds of data errors may be used to model the pattern of erroneous data records received by a reporting tool in the data processing system 100, allowing the root cause of the data errors to be deduced from the patterns. Embodiments may include grouping the erroneous data records into as few groups as possible and into as large a group as possible; leveraging decision logic that has been derived from the model of the data errors; and providing a link from the groups of erroneous data records back to the model of the data error, allowing the root cause of the erroneous data records aggregated in the group to be deduced and the appropriate technical support system 123 to provide technical repairs for the group of erroneous data records to be determined.

One exemplary error model may include a list of data transformation logic segments (as described below with reference to FIG. 3) of an ETL process which can possibly be incorrect, accompanied by a description of the pattern of erroneous data records the incorrect process could cause and a description of a technical support system 123 that could provide technical repairs for the errors. This is summarized in the table below.

Data transformation logic can be used in many different types of data analysis projects, such as data migration projects for application system consolidations, preparing a data warehouse, and Enterprise Application Integration projects facilitating the real-time data exchange between application systems. Transformation logic may include, but is not limited to, a structural transformation and a value-based transformation.

Structural transformation is typically described on a per data source basis. The structural transformation changes the structure of the data from the source records to that of a target database, for example, the error handling module 101. This technique transforms data at the record level. Hence, if something is wrong or there is technical deficiency in a data source 121, all data records from that data source 121 will violate a validation rule, while data records from other data sources may not violate that validation rule. The root cause, in this example, may be a malicious structural transformation that transforms the data from the data source 121. For this kind of data error, various embodiments may select the technical support system 123 having a technical task for developing or monitoring the ETL processes and providing technical repairs for the erroneous data records that are received from the data source 121 with this structural transformation error.

A value based transformation may utilize a value mapping in the ETL process to transform source instance values in data records from the data source 121 into a new value that is supported by a target system, such as the error handling module 101. For example, value mappings may define how codes, such as user status, material type, etc. are mapped when source and target systems use different codes or abbreviations for the same parameter (e.g. material type). Such mappings may use, for example, lookup tables, case-logic, or if-then-else-logic implemented in a programming language. If there is an error in such value mappings, some data records from a specific data source 121 may violate a validation rule. Typically all data records with the same value from that data source 121 will violate the rule. The root cause may indicate an incorrect value mapping in the value mapping segment of the ETL process. For this kind of data error, the technical support system 123 having a technical task for developing or monitoring the ETL processes may be selected to provide technical repairs for the erroneous data records that are received from the data source 121. For this kind of data error, various embodiments may select the technical support system 123 having a technical task for providing mapping tools between source and target systems, such as look-up tables, to provide technical repairs for the erroneous data records that are received from the data source 121 with this value transformation error.

An ETL process may include logic that jointly processes the data from all data sources 121. If there is a deficiency, such as a programming error in this joint processing logic, data errors can occur in the data records independent of the data source 121. The root cause may indicate a flaw in the joint processing logic. For this kind of data errors, various embodiments may select the technical support system 123 having a technical task for developing or monitoring the ETL processes that provides technical repairs for the erroneous data records that are received with this joint processing logic error, regardless of the data source 121.

The following is a table summarizing the error models described above.

| Error Pattern | Root Cause | Technical support system |
|---|---|---|
| all records have a data error | joint processing logic | ETL processing |
| all records of one source system have a data error | structural transformation is wrong | ETL processing |
| all records of one source system with the same source value in the current field have a data error | value mapping for that source value is wrong | mappings tools production |

ETL processing logic may work on a per field basis of a data set that is a data table. In this case, the grouping of the erroneous data records may be done on a per field basis. As a result, erroneous data records from one field of the data table might be caused by an incorrect structural transformation, while erroneous data records from another field might be caused by incorrect value mappings.

Figure 3:
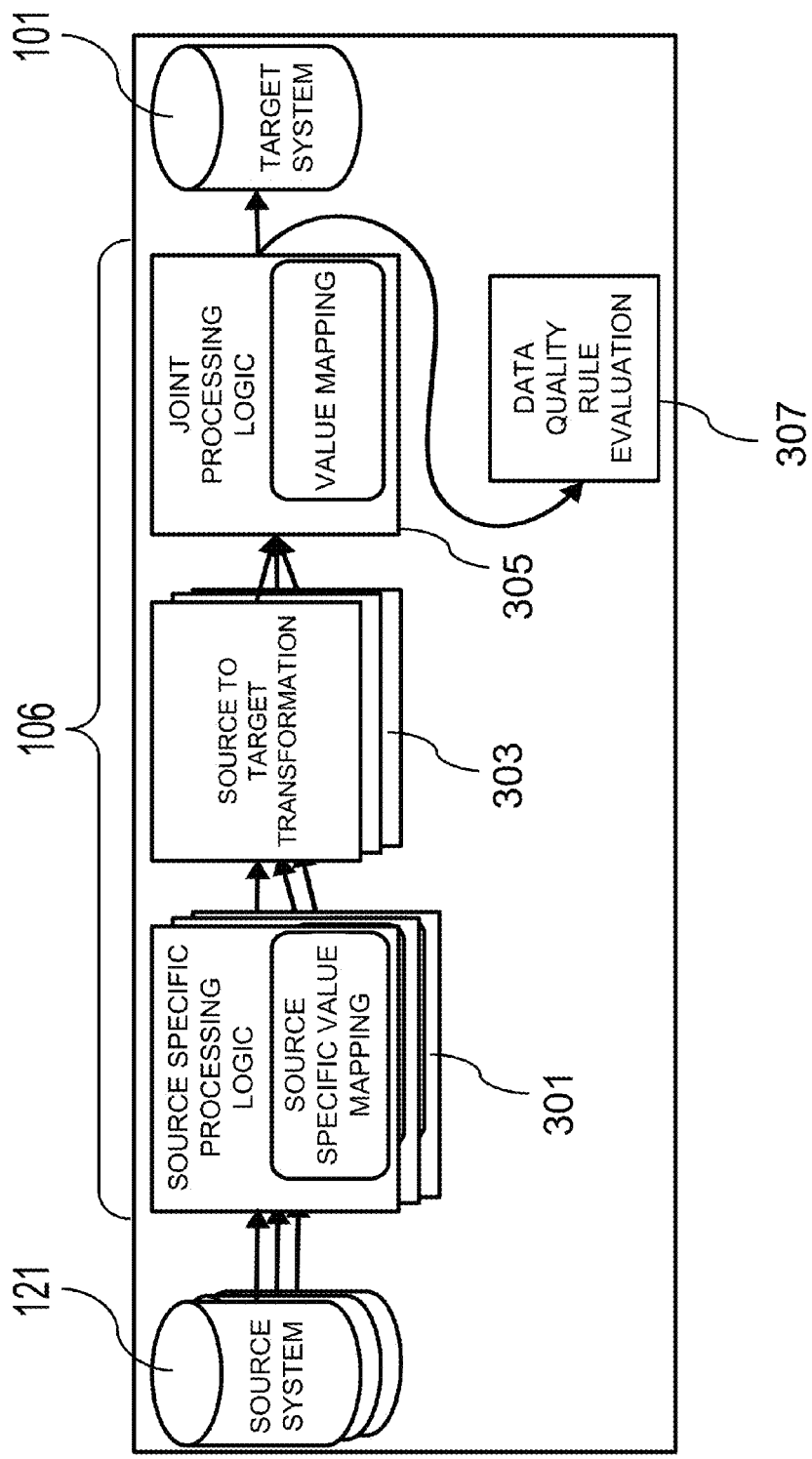
FIG. 3 illustrates an exemplary data transformation logic, in accordance with an embodiment of the present disclosure.

The root causes in an error model are based on an abstract model of the data transformation logic that is used to process the data. FIG. 3 illustrates an exemplary data transformation logic, such as may be used in a data consolidation project, in accordance with an embodiment of the present disclosure. This exemplary data transformation logic illustrates the data processing flow connected to the data error handling module 101 (FIG. 1).

The exemplary data transformation logic begins with the data being extracted from a data source 121. Source-specific processing logic 301 then modifies the data, in the context of the data source 121, and applies source-specific value mappings. This pre-processing of the data is in the scope of the data source 121. At 303, the source to target transformation changes the data from the source context into the target context and restructures the data appropriately. The data transformation logic continues with joint processing logic 305 that processes the data from multiple data source systems 121 jointly, in the context of the target system 101, after the data has been aligned and brought into the target system 101 context. In this exemplary transformation, the joint processing logic 305 also applies a value mapping to the data and does a post-processing of the data, in the scope of the target system 101. The data is then sent either directly to the target system 101, or to a Data Quality Rule Evaluation component 307 first, which verifies that the data satisfies all defined data quality rules (which can represent syntactical constraints of the target system 101). Any violations to the defined data quality rules yields data errors which are then fed into data error processing, such as the root cause analysis component 127, which is further described below.

Other types of data transformation logic may be used. The present disclosure is not restricted to a particular topology of the data transformation logic.

In this example, root cause analysis component 127 receives the error model and the data records (e.g. the data set described above) as input and uses decision logic that is based on the error model to create groups of erroneous data records. Alternatively, the root cause analysis component 127 may work on exceptions, rather than erroneous data records and create exception groups rather than groups of erroneous data records. The internal decision logic that detects the groups is the same in both cases.

Figure 4:
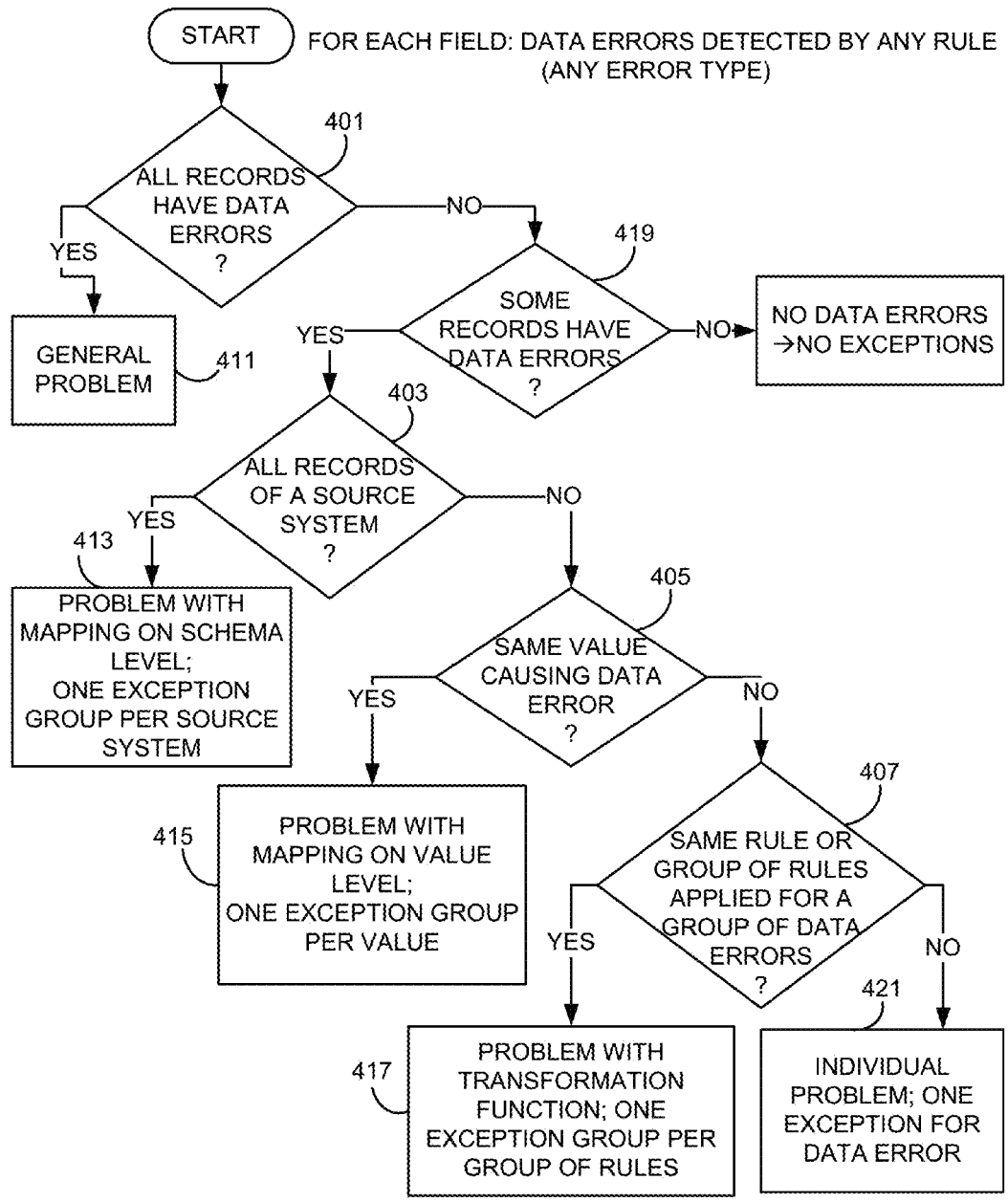
FIG. 4 is an exemplary decision tree for grouping erroneous data records, in accordance with an embodiment of the present disclosure.

FIG. 4 is an exemplary decision tree for grouping erroneous data records, in accordance with an embodiment of the present disclosure. This decision tree is one example for efficiently implementing the decision logic. This approach for the decision logic may yield minimal runtimes. The exemplary decision tree checks, at 401-407, for all patterns described in the error models described above, starting from the pattern with the largest coverage and proceeding to those with less coverage. Following the above error models, a first check, at 401, is made to determine if all records have data errors (e.g., a certain field in the data table included in all the records), and if the check is positive, all the erroneous data records may be grouped, at 411, in one error group having a general problem. Otherwise, it is determined, at 403 and 419, if some erroneous data records from the same data source 121 (FIG. 1) have data errors in a certain field, and if so, these erroneous records from the same data source 121 may be grouped, at 413, in one error group. Otherwise, it is checked, at 405 if erroneous data records having data errors that have the same or very few values that violate the validation rules. If so, the erroneous data records having data errors related to a same value may be grouped, at 415, in one error group. Otherwise, it is determined, at 407 if the same rule or group of rules apply for erroneous data records. If so, these erroneous data records with data errors related to the same rule or group of rules may be grouped, at 417, in one error group. Otherwise, each of the erroneous data records may be treated individually, at 421, and hence gets its own "individual" exception. If no data records have data errors, determined at 401 and 419, no groups or exceptions are created.

In various embodiments, for decision logic which is based on a decision tree, a decision tree compiler of the root cause analysis component 127 automates the process of creating the decision tree from the error model. The data transformation logic may contain additional or different processing steps compared to those described above. For each of those processing steps, hypotheses of what can go wrong, how this would show up in the output of the data validation rules, and which technical support system 123 can be used to solve the technical problem may be derived. Once a complete model of all the data errors that can occur is obtained, the model may be used as input into the compiler. The compiler may aggregate the error patterns for individual data error causes into a decision tree. The compiler may sort the error patterns by their restrictiveness, i.e., affecting all records vs. all records from one source system vs. only records with a certain value have data errors, and turn them into a decision tree that allows for an efficient computation of the groups.

Figure 5:
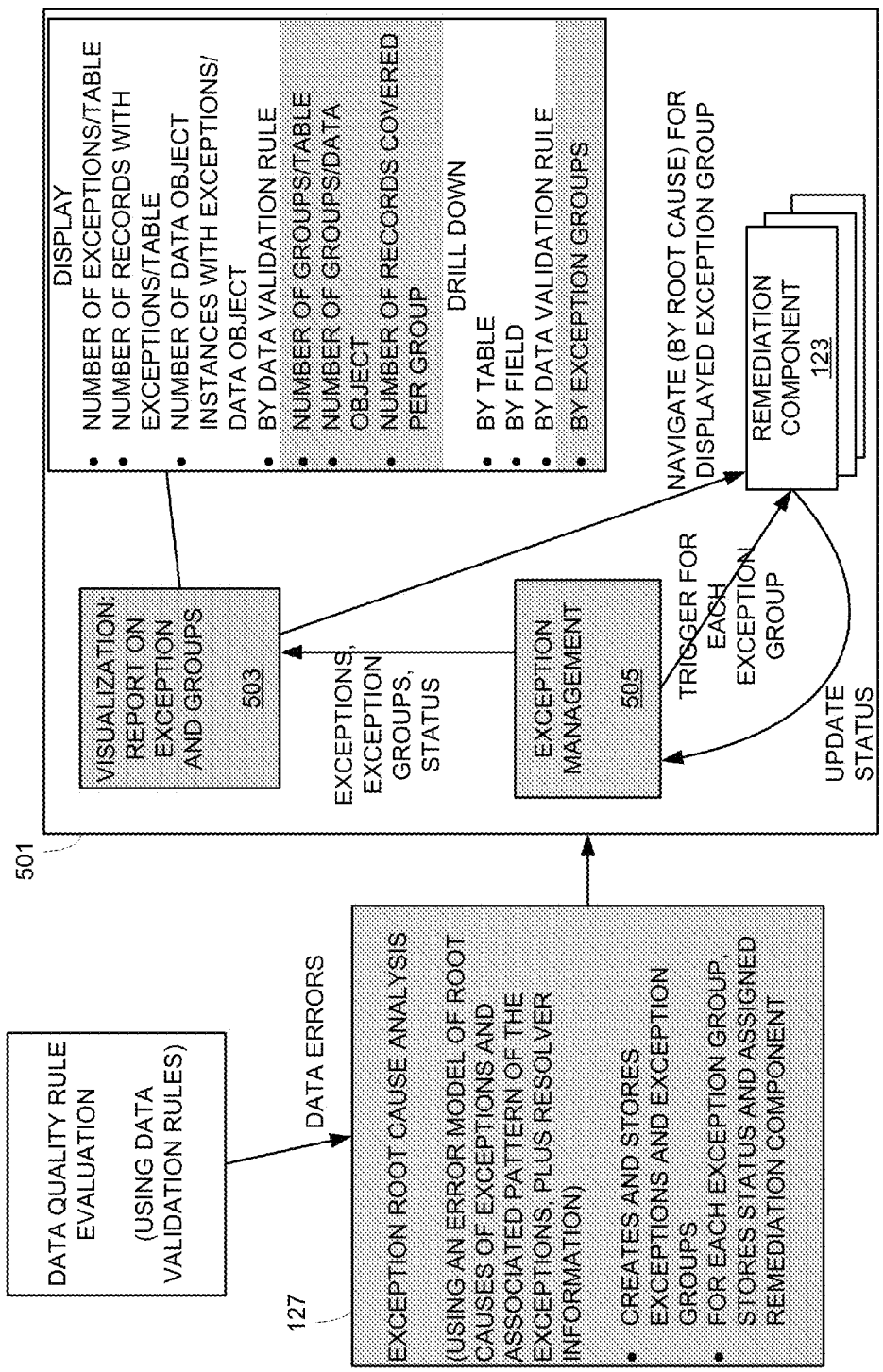
FIG. 5 illustrates the reporting side of a data processing system, in accordance with an embodiment of the present disclosure.

FIG. 5 illustrates the reporting side of data processing system 100, in accordance with an embodiment of the present disclosure. The reporting side illustrated leverages root cause analysis component 127 and an exception root cause analysis function of the root cause analysis component 127. The exception root cause analysis function 127 is introduced to intelligently detect root causes for exception groups based on the error model described above. FIG. 5 shows an example of data error processing and reporting with root cause analysis input to a reporting component 501 of the data processing system 100. The reporting component 501 may not only display the number of exceptions (per table, per field, etc.) using visualization component 503, but may also display the number of exception groups that have been detected. The visualization component 503 may also show how many records are covered by each of the detected exception groups. The reporting may allow a drill down to the level of groups of erroneous data records. The exception management component 505 may navigate to the erroneous data records that are covered by an exception group or error group, where each exception group or error group includes erroneous data records with the same root cause.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for processing data errors in a data processing system, the method comprising:
   receiving, by a computer, one or more patterns, wherein the one or more patterns describe characteristics of an erroneous data record and are associated with a root cause, the root cause including a description of a technical deficiency of a hardware component or a software component causing the data error in the erroneous data record;
   receiving, by the computer, a data set, the data set referring to one or more data tables having columns and rows stored by a single data source system; and
   responsive to determining, by the computer, that a first set of data records in the received data set have characteristics that match a first pattern of the one or more patterns by determining whether each data record contained within the first set of data records set fulfills conditions described by the first pattern, determining, by the computer, whether all erroneous data records have the same root cause in the single data source system;
   assigning, by the computer, the first set of data records of the received data set having characteristics that match the first pattern to a first error group representing the first set of data records from the single data source system with the same root cause; and
   responsive to determining, by the computer, that a second set of data records in the received data set have characteristics that match a second pattern of the one or more patterns, that a percentage of data records of the received data set that do not match the second pattern of the one or more patterns is less than a threshold value, and that the first error group does not include the second set of data records:
   assigning, by the computer, the second set of data records of the received data set having characteristics that match the second pattern to a second error group, the first error group received from a first data source and the second error group received from the first data source.

2. The method according to claim 1, wherein determining, by the computer, that the first set of data records in the received data set have characteristics that match the first pattern of the one or more patterns further comprises:
   determining, by the computer, that a percentage of data records of the received data set that do not match the first pattern of the one or more patterns is less than a threshold value;
   treating errors in the data records that do not match the first pattern individually; and
   treating errors in the data records that match the first pattern as a group.

3. The method according to claim 1, further comprising:
   responsive to determining, by the computer, that the root cause associated with the first pattern matches the root cause associated with the second pattern:
   merging, by the computer, the first error group and the second error group allowing fixes for data records of the first error group and the second error group to be the same.

4. The method according to claim 1, wherein the received data set is processed by one or more processes before being received, wherein the root cause associated with the first pattern causes at least a first failure in a respective at least one Extract Transform and Load (ETL) process of the one or more processes, and wherein the root cause associated with the second pattern causes at least a second failure in a respective at least one process of the one or more processes, further comprises:
   responsive to determining, by the computer, that the first failure occurs in at least one same process of the one or more processes as the second failure:
   merging, by the computer, the first error group and the second error group allowing fixes for data records of the first error group and the second error group to be the same.

5. The method according to claim 1, wherein the received data set is an Extract Transform and Load (ETL) processed data set and wherein the root cause is a failure in a data operation of an ETL process during the extract, transformation, or load process.

6. The method according to claim 1, further comprising:
   receiving, by the computer, a plurality of technical support systems, a technical support system providing technical repairs for an erroneous data record, the plurality of technical support systems having one or more predefined technical tasks;
   selecting, by the computer, a technical support system from among the plurality of technical support systems having the predefined technical task associated with the root cause and with the first pattern, the root cause a technical deficiency of a hardware system that causes one or more data errors in erroneous data records;

sending, by the computer, the first error group to the selected technical support system; and receiving, by the computer, the technical repair of the root cause, thereby fixing the erroneous data records of the first error group.

7. The method according to claim 1, wherein the characteristics of an erroneous data record include a format of the erroneous data record.

8. The method according to claim 1, wherein the one or more patterns are represented by a decision tree having one or more nodes, the one or more nodes including a decision, wherein the decision tree starts from a pattern having a largest coverage and proceeds to patterns having less coverage, one or more patterns represented in the decision tree considering whether all records have data errors.

9. A computer program product for processing data errors in a data processing system, the computer program product comprising one or more non-transitory computer readable storage medium and program instructions stored on at least one of the one or more computer readable storage medium, the program instructions comprising:

program instructions to receive, by a computer, one or more patterns, wherein the one or more patterns describe characteristics of an erroneous data record and are associated with a root cause, the root cause including a description of a technical deficiency of a hardware component or a software component causing the data error in the erroneous data record;

program instructions to receive, by the computer, a data set, the data set referring to one or more data tables having columns and rows stored by a single data source system; and responsive to determining, by the computer, that a first set of data records in the received data set have characteristics that match a first pattern of the one or more patterns by determining whether each data record contained within the first set of data records fulfills conditions described by the first pattern, determining, by the computer, whether all erroneous data records have the same root cause in the single data source system;

program instructions to assign, by the computer, the first set of data records of the received data set having characteristics that match the first pattern to a first error group representing the first set of data records from the single data source system with the same root cause; and responsive to determining, by the computer, that a second set of data records in the received data set have characteristics that match a second pattern of the one or more patterns, that a percentage of data records of the received data set that do not match the second pattern of the one or more patterns is less than a threshold value, and that the first error group does not include the second set of data records:

program instructions to assign, by the computer, the second set of data records of the received data set having characteristics that match the second pattern to a second error group.

10. The computer program product according to claim 9, further comprising:

responsive to determining, by the computer, that the root cause associated with the first pattern matches the root cause associated with the second pattern:

program instructions to merge, by the computer, the first error group received from a first data source and the second error group received from the first data source allowing fixes for data records of the first error group and the second error group to be the same.

11. The computer program product according to claim 9, wherein the received data set is processed by one or more processes before being received, wherein the root cause associated with the first pattern causes at least a first failure in a respective at least one Extract Transform (ETL) process of the one or more processes, and wherein the root cause associated with the second pattern causes at least a second failure in a respective at least one process of the one or more processes, further comprises:

responsive to determining, by the computer, that the first failure occurs in at least one same process of the one or more processes as the second failure:

program instructions to merge, by the computer, the first error group and the second error group allowing fixes for data records of the first error group and the second error group to be the same.

12. The computer program product according to claim 9, wherein the received data set is an Extract Transform and Load (ETL) processed data set and wherein the root cause is a failure in a data operation of an ETL process during the extract, transformation, or load process.

13. The computer program product according to claim 9, further comprising:

program instructions to receive, by the computer, a plurality of technical support systems, a technical support system providing technical repairs for an erroneous data record, the plurality of technical support systems having one or more predefined technical tasks;

program instructions to select, by the computer, a technical support system from among the plurality of technical support systems having the predefined technical task associated with the root cause and with the first pattern, the root cause a technical deficiency of a hardware system that causes one or more data errors in erroneous data records;

program instructions to send, by the computer, the first error group to the selected technical support system; and program instructions to receive, by the computer, the technical repair of the root cause, thereby fixing the erroneous data records of the first error group.

14. A computer system for processing data errors in a data processing system, the computer system comprising one or more processors, one or more computer readable memories, one or more non-transitory computer readable tangible storage medium, and program instructions stored on at least one of the one or more storage medium for execution by at least one of the one or more processors via at least one of the one or more memories, the program instructions comprising:

program instructions to receive, by a computer, one or more patterns, wherein the one or more patterns describe characteristics of an erroneous data record and are associated with a root cause, the root cause including a description of a technical deficiency of a hardware component or a software component causing the data error in the erroneous data record;

program instructions to receive, by the computer, a data set, the data set referring to one or more data tables having columns and rows stored by a single data source system; and responsive to determining, by the computer, that a first set of data records in the received data set have characteristics that match a first pattern of the one or more patterns by determining whether each data record contained within the first set of data records set fulfills conditions described by the first pattern, determining, by the computer, whether all erroneous data records have the same root cause in the single data source system;

program instructions to assign, by the computer, the first set of data records of the received data set having characteristics that match the first pattern to a first error group representing the first set of data records from the single data source system with the same root cause; and responsive to determining, by the computer, that a second set of data records in the received data set have characteristics that match a second pattern of the one or more patterns, that a percentage of data records of the received data set that do not match the second pattern of the one or more patterns is less than a threshold value, and that the first error group does not include the second set of data records;

program instructions to assign, by the computer, the second set of data records of the received data set having characteristics that match the second pattern to a second error group, the first error group received from a first data source and the second error group received from the first data source.

15. The computer system according to claim 14, further comprising:
responsive to determining, by the computer, that the root cause associated with the first pattern matches the root cause associated with the second pattern:
program instructions to merge, by the computer, the first error group and the second error group allowing fixes for data records of the first error group and the second error group to be the same.

16. The computer system according to claim 14, wherein the received data set is processed by one or more processes before being received, wherein the root cause associated with the first pattern causes at least a first failure in a respective at least one Extract Transform and Load (ETL) process of the one or more processes, and wherein the root cause associated with the second pattern causes at least a second failure in a respective at least one process of the one or more processes, further comprises:
responsive to determining, by the computer, that the first failure occurs in at least one same process of the one or more processes as the second failure:
program instructions to merge, by the computer, the first error group and the second error group allowing fixes for data records of the first error group and the second error group to be the same.

17. The computer system according to claim 14, further comprising:
program instructions to receive, by the computer, a plurality of technical support systems, a technical support system providing technical repairs for an erroneous data record, the plurality of technical support systems having one or more predefined technical tasks;
program instructions to select, by the computer, a technical support system from among the plurality of technical support systems having the predefined technical task associated with the root cause and with the first pattern, the root cause a technical deficiency of a hardware system that causes one or more data errors in erroneous data records;
program instructions to send, by the computer, the first error group to the selected technical support system; and
program instructions to receive, by the computer, the technical repair of the root cause, thereby fixing the erroneous data records of the first error group.

* * * * *